(12) United States Patent  
Fabiyi et al.

(10) Patent No.: US 9,656,218 B2  
(45) Date of Patent: May 23, 2017

(54) GAS INJECTION METHOD AND APPARATUS

(71) Applicants: Malcolm E. Fabiyi, Chicago, IL (US); Karen Connery, Downers Grove, IL (US); Witawat Wattanapanom, Chicago, IL (US); Richard A. Novak, Naperville, IL (US)

(72) Inventors: Malcolm E. Fabiyi, Chicago, IL (US); Karen Connery, Downers Grove, IL (US); Witawat Wattanapanom, Chicago, IL (US); Richard A. Novak, Naperville, IL (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 15/274,507

(22) Filed: Sep. 23, 2016

(65) Prior Publication Data

US 2017/0014782 A1   Jan. 19, 2017

Related U.S. Application Data

(62) Division of application No. 13/587,128, filed on Aug. 16, 2012.
(Continued)

(51) Int. Cl.
*B01F 3/00* (2006.01)
*B01F 13/00* (2006.01)
(Continued)

(52) U.S. Cl.
CPC ...... *B01F 3/04539* (2013.01); *B01F 3/04106* (2013.01); *B01F 3/04262* (2013.01);
(Continued)

(58) Field of Classification Search
CPC .............. B01F 3/04106; B01F 3/04539; B01F 13/0049
(Continued)

(56) References Cited

U.S. PATENT DOCUMENTS 5,154,898 A * 10/1992 Ajinkya ................. B01J 19/246  
  261/123  
6,273,402 B1   8/2001 Cheng  
(Continued)

FOREIGN PATENT DOCUMENTS

EP   1 005 898 A1   6/2000  
EP   1 925 597 A1   5/2008  
WO   WO 2009/029312 A1   3/2009

OTHER PUBLICATIONS

Mott Corporation: "High-Efficiency Gas/Liquid Contacting", Jan. 1, 2010, pp. 1-9, XP055058576, Retrieved from the Internet: URL: http://www.mottcorp.com/resource/pdf/sparging.pdf on Apr. 4, 2013, p. 3, left-hand column.

*Primary Examiner* — Tony G Soohoo  
*Assistant Examiner* — Anshu Bhatia  
(74) *Attorney, Agent, or Firm* — Donald T. Black

(57) ABSTRACT

A method and apparatus for injecting a gas into a liquid in which a rotating helical impeller within a draft tube submerged in the liquid creates a liquid flow within the draft tube. Gas bubbles are injected into the draft tube either above or below or alongside the helical impeller or in all three locations. The liquid is drawn into the draft tube with a superficial velocity greater than a substantially uniform terminal ascent velocity of the gas bubbles to allow entrainment of undissolved gas bubbles in the bulk liquid into the liquid being drawn into the draft tube. The gas bubbles are injected with a uniform diameter of between about 10.0 microns and about 1.0 millimeters. The small bubble size
(Continued)

enhances the dissolution of the gas into the liquid and also allow the entrainment of the gas into the liquid being drawn into the draft tube.

2 Claims, 4 Drawing Sheets

Related U.S. Application Data

(60) Provisional application No. 61/565,860, filed on Dec. 1, 2011.

(51) Int. Cl.
*B01F 3/04* (2006.01)
*B01F 7/00* (2006.01)
*C02F 3/12* (2006.01)
*C02F 3/16* (2006.01)
*C02F 3/20* (2006.01)
*C02F 3/26* (2006.01)
*C02F 101/30* (2006.01)

(52) U.S. Cl.
CPC ...... *B01F 3/04609* (2013.01); *B01F 7/00358* (2013.01); *B01F 7/00733* (2013.01); *B01F 13/0049* (2013.01); *C02F 3/1284* (2013.01); *C02F 3/16* (2013.01); *C02F 3/206* (2013.01); *C02F 3/26* (2013.01); *B01F 2003/0468* (2013.01); *B01F 2003/04553* (2013.01); *B01F 2003/04666* (2013.01); *B01F 2003/04673* (2013.01); *B01F 2003/04709* (2013.01); *B01F 2215/0431* (2013.01); *C02F 2101/301* (2013.01); *Y02W 10/15* (2015.05)

(58) Field of Classification Search
USPC .................................................. 366/302, 102
See application file for complete search history.

(56) References Cited

U.S. PATENT DOCUMENTS

2008/0116132 A1    5/2008    Fabiyi et al.
2008/0118946 A1*   5/2008    Fabiyi ................ B01F 3/04609
                                                        366/302

* cited by examiner

GAS INJECTION METHOD AND APPARATUS

RELATED APPLICATIONS

The present application is a divisional of U.S. application Ser. No. 13/587,128, filed on Aug. 16, 2012, which claims the benefit of U.S. Provisional Application No. 61/565,860, filed on Dec. 1, 2011, the entire contents of which are incorporated by reference herein in its entirety.

FIELD OF THE INVENTION

The present invention relates to a gas injection method and apparatus in which a gas is injected into a liquid with the use of a helical impeller located within a draft tube and driven by a motor. More particularly, the present invention relates to such a method and apparatus in which the gas is injected into the draft tube above or below or alongside the helical impeller by an injector located within the draft tube that can be a sparger or nozzles to produce gas bubbles of a uniform small size to enhance dissolution of the gas into the liquid and recirculation of undissolved gas bubbles back to the draft tube.

BACKGROUND OF THE INVENTION

A variety of processes, involve the dissolution of gases in liquids. For example, in aerobic wastewater treatment systems, oxygen is required by the bacteria that enable the removal of the organic waste in the water. The required amount of oxygen can be effectively dissolved into process streams using mechanically agitated mixer systems. Similarly, in many drinking water treatment systems, chemicals such as flocculants and coagulants are added to facilitate the sedimentation and removal of contaminating solids in the liquid. Carbon dioxide is added for maintaining optimal pH conditions in some flocculation and coagulation processes by means of mechanically agitated gas dissolution systems.

Although surface mixing and gas dissolution systems are widely utilized, submerged mixing systems have certain advantages. One advantage is that such submerged mixing systems can be oriented, vertically, horizontally or at an angle for purposes of directional mixing or more optimal gas dissolution. Depth has a significant impact on effective system pressures; and the solubility of gases is known to be affected significantly by the pressure. Hence, a submerged mixing system when operated in water at a depth of ten meters can effectively enable the dissolution of about twice the volume of gas than would be possible if the mixing occurred at the surface.

A submerged mixing apparatus is disclosed in U.S. Pat. No. 6,273,402. The apparatus is adapted to be submerged in a tank that can contain waste water and sludge. In this device, a helical impeller connected to a motor rotates within a submerged draft tube. The draft tube and motor are connected to a ballast chamber that can be filled with ballast to cause the apparatus to sink within the liquid. The ballast chamber has a head space through which oxygen is injected and an undersurface that is provided with a slight slope towards inlet openings to the draft tube. The rotating impeller draws the liquid into the inlet opening for mixing with incoming oxygen. The resulting gas-liquid mixture is discharged from the other end of the draft tube in an expanding jet-like flow. Any oxygen bubbles that are not dissolved rise within the liquid toward the surface. A portion of these oxygen bubbles will be trapped by the undersurface of the ballast chamber and be entrained in liquid that is being drawn into the inlet openings. Another portion of the undissolved gas bubbles will escape from the surface of the liquid.

There are a number of drawbacks to the mixing and gas dissolution system described in U.S. Pat. No. 6,273,402. One major drawback is that the impeller itself is providing suction to draw the gas into the liquid. As the amount of the gas to be drawn increases, there will be less suction provided by the impeller and consequently, the amount of liquid that is able to be drawn by such a device will be limited, until eventually a condition known as flooding occurs, when no further liquid can be drawn in by the impeller.

Additionally, there is no control over bubble size of the gas bubbles that are produced by the action of the impeller. Although there are many factors that will have an influence on the dissolution rate of gas within a liquid within such a mixing device, for a given device subjected to particular operational conditions, the size of the bubbles will determine the interfacial surface area available for gas-liquid contacting and therefore, the amount of gas that is able to be dissolved in the liquid. Another major concern is the fact that the device shown in this patent can only be operated in a vertical orientation in that it depends on the underside of the ballast chamber in collecting gas that is not dissolved in the liquid for recirculation back to the draft tube, and relies on the horizontal orientation of the ballast chamber for maintaining stability at any given depth. In some water treatment systems it could be important not to direct the flow directly from the draft tube into the bottom of the treatment basin. If the basin is shallow and has an earthen bottom or polymeric lining, then the jet of liquid can damage the bottom surface or layer. However, even where the basin is made of a solid material such as concrete, if the liquid leaving the draft tube strikes the bottom at high velocity, before the bubbles disengage from the high velocity liquid, the bubbles will spread out a sufficient distance that will prevent the rising bubbles from being collected on the underside of the ballast chamber. This is exacerbated with large bubble sizes that will attain a sufficient terminal ascent velocity to escape from the surface of the liquid and avoid re-entrainment with the liquid being drawn into the draft tube.

There have been devices that do not have to operate in a vertical orientation. In one of such devices, the gas is injected through a ring-like manifold into the interior of the draft tube and below the impeller. This type of device has a series of openings that are each ⅛ of an inch. This produces large bubbles that will attain a terminal ascent velocity that is sufficiently high that a non-insignificant portion of the injected gas will escape from the surface of the liquid. Furthermore, the impeller used is not a helical impeller, but rather, a bladed impeller. There are limitations on the amount of gas that can be dissolved in such an apparatus because, as can be appreciated, as the amount of gas increases, there will not be enough liquid to be drawn and accelerated by the impeller.

As will be discussed, the present invention provides a method and apparatus in which the gas is injected directly into the draft tube with a controlled gas bubble size that will both enhance the degree to which the gas can be dissolved in the liquid and also the degree to which the undissolved gas will be entrained in the liquid flow being drawn into the draft tube by the impeller.

SUMMARY OF THE INVENTION

The present invention provides a method of injecting a gas in which a helical impeller is rotated within a draft tube located in the liquid. This creates a liquid flow by drawing the liquid into the draft tube from at least one inlet opening situated at one end of the draft tube and discharging the liquid flow from a discharge opening of the draft tube located at the other end thereof. Gas bubbles of the gas are injected into the draft tube, in at least one location situated above or below or alongside the helical impeller such that a portion of the gas bubbles dissolve in the liquid flow inside of the draft tube and a remaining portion of the gas bubbles are discharged from the discharge opening. The gas bubbles discharged from the discharge opening are carried into the liquid, within the liquid flow, where part of the remaining portion of the gas bubbles dissolve in the liquid and a further part of the remaining portion of the gas bubbles is entrained into the liquid drawn into the draft tube through the at least one inlet opening.

The gas bubbles are injected into the liquid flow with a uniform diameter of between about 10.0 microns and about 1.0 millimeter to enhance the surface area of the gas bubbles and therefore, a dissolution rate of the gas within the liquid and to impart a buoyancy to the further part of the remaining portion of the gas bubbles that will result in at least a substantially uniform terminal ascent velocity thereof. It is to be noted that as used herein and in the claims, the term "about" when used in connection with gas bubble size means plus or minus ten percent. The liquid is drawn into the draft tube with a superficial velocity greater than the substantially uniform terminal ascent velocity of the bubbles to enable the entrainment of the further part of the remaining portion of the gas bubbles into the liquid while substantially preventing escape of the gas from a surface of the liquid.

The gas bubbles can be injected from a plurality of spargers located inside the draft tube at radially spaced locations thereof. Alternatively, the gas bubbles can be injected from an inner porous section of a sparger located within the draft tube and having a ring-like configuration. In either of such cases, the uniform diameter of the gas bubbles is between about 10.0 microns and about 500.0 microns. A further option is to supply the gas supplied to a plurality of nozzles located inside the draft tube at radially spaced locations thereof and the gas bubbles are injected from the plurality of nozzles. In case of nozzle injection the uniform diameter of the gas bubbles is between about 500.0 microns and about 1.0 millimeter. The gas that is injected can be oxygen, an ozone containing mixture or carbon dioxide.

The present invention also provides an apparatus for injecting a gas into a liquid. The apparatus has a draft tube adapted to be submerged in a liquid and having at least one inlet opening situated at one end of the draft tube and a discharge opening located at the other end thereof. A helical impeller is located within the draft tube and a motor is connected to the draft tube. The shaft of the motor projects into the draft tube from the one end of the draft tube and is connected to the helical impeller to rotate the helical impeller and thereby to create a liquid flow. This liquid flow is created by drawing the liquid into the draft tube from the at least one inlet opening and discharging the liquid flow from a discharge opening. Means are provided for injecting gas bubbles of the gas into the liquid flow, within the draft tube, in at least one location situated above or below or alongside the helical impeller. As a result of such injection a portion of the gas bubbles dissolve in the liquid flow inside of the draft tube and a remaining portion of the gas bubbles are discharged from the discharge opening and are carried into the liquid, within the liquid flow. Part of the remaining portion of the gas bubbles dissolve in the liquid and a further part of the remaining portion of the gas bubbles is entrained into the liquid drawn into the draft tube through the at least one inlet opening. The gas bubble injector means is configured to inject the gas bubbles with a uniform diameter of between about 10.0 microns and about 1.0 millimeter to enhance the surface area of the gas bubbles and therefore, a dissolution rate of the gas within the liquid and to impart a buoyancy to the further part of the remaining portion of the gas bubbles that will result in at least a substantially uniform terminal ascent velocity thereof. The impeller is configured and the motor is able to rotate the impeller at a sufficient speed such that the liquid drawn into the draft tube has a minimum superficial velocity greater than the substantially uniform terminal ascent velocity of the gas bubbles to enable the entrainment of the further part of the remaining portion of the gas bubbles into the liquid drawn into the draft tube while substantially preventing escape of the gas from a surface of the liquid.

The gas bubble injector means can comprise at least one injector having at least one injector opening and a means for supplying the gas to the at least one injector at a predetermined flow rate. The at least one injector opening is sized to produce the gas bubbles within the liquid with the at least substantially uniform diameter at the predetermined flow rate. The at least one gas injector can be a plurality of spargers located inside the draft tube at radially spaced locations thereof and the at least one injector opening is a plurality of injector openings formed by a metallic, sintered metal or polymeric ultrafine bubble surface layer. The at least one injector can be a sparger having a plurality of injector openings. Such sparger can comprise a ring-like element located inside the draft tube and having an inlet for the gas penetrating a sidewall of the draft tube. The ring-like element has an outer solid section and an inner porous section connected to the outer solid section and formed by a metallic, sintered metal or polymeric ultrafine bubble surface layer to provide the plurality of injector openings. In case of sparging, the plurality of injector openings are sized to produce the gas bubbles within the liquid, at the predetermined flow rate, with the uniform diameter within a range of between about 10 microns and about 500 microns. Alternatively, the at least one gas injector can be a plurality of nozzles located inside the draft tube at radially spaced locations thereof and providing a plurality of injector openings from the plurality of nozzles. Each of the plurality of injector openings is sized to produce the gas bubbles within the liquid, at the predetermined flow rate, with the uniform diameter being within a range of between about 500.00 microns and about 1.0 millimeter.

In any embodiment of the present invention, the motor can be configured to be submerged within the liquid along with the draft tube. The draft tube can have a cruciform arrangement of guide vanes at the other end of the draft tube.

BRIEF DESCRIPTION OF THE DRAWINGS

While the specification concludes with claims particularly pointing out the subject matter that Applicants regard as their invention, it is believed that the invention will be better understood when taken in connection with the accompanying drawings in which:

DETAILED DESCRIPTION

Figure 1:
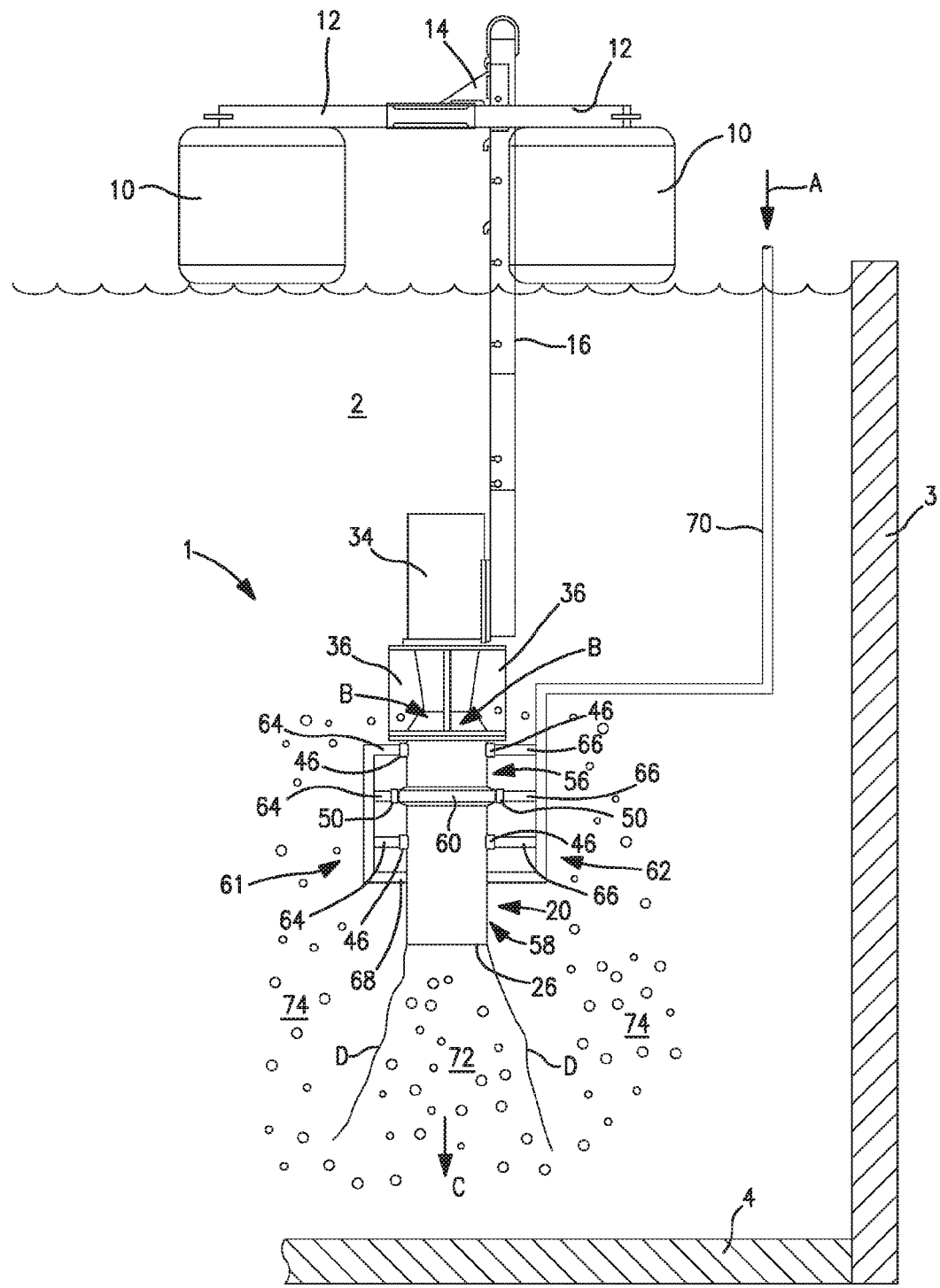
FIG. 1 is an elevational view of an apparatus for carrying out a method in accordance with the present invention shown in an operational state within a wastewater treatment basis shown in fragmentary, sectional view.

With reference to FIG. 1, an apparatus 1 in accordance with the present invention is illustrated. Apparatus 1 is designed to inject a gas indicated by arrowhead "A", for example, oxygen, into a liquid 2 which for purposes of illustration is shown as contained in a tank having sidewalls 3. Such a tank could be part of an aerobic wastewater treatment system in which the liquid 2 is mixed liquor containing wastewater and the gas "A", oxygen, is injected into the mixed liquor so that it dissolves in the liquid. The present invention is, however, not limited to such an application and the foregoing is only mentioned for purposes of illustration.

Figure 2:
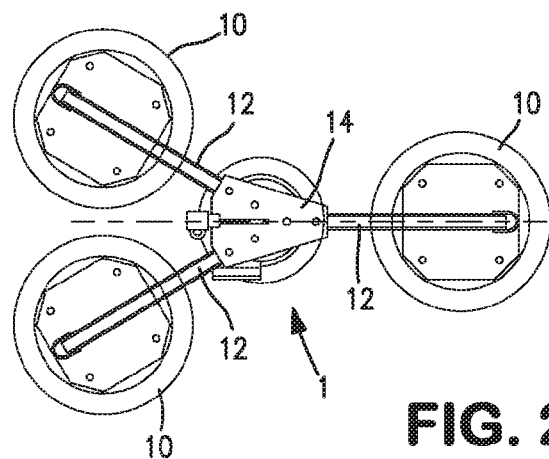
FIG. 2 is a top plan view of the apparatus shown in FIG. 1.

With additional reference to FIG. 2, apparatus 1 is designed to be completely submerged within liquid 2 and therefore, is suspended within the liquid 2. This is accomplished in a conventional manner by means of an arrangement of floats 10 that are connected by members 12, which are connected to a top flange 14. A downwardly extending member 16 is in turn connected to top flange 14 and to apparatus 1. However, this is for purposes of illustration only and the apparatus 1 could be connected to a beam or other like member spanning the sidewalls 3 of the tank or other fashion as would occur to those skilled in the art. Further, although apparatus 1 is illustrated in a vertical orientation, it is possible to orient the apparatus 1 at an angle to the vertical.

Figure 3:
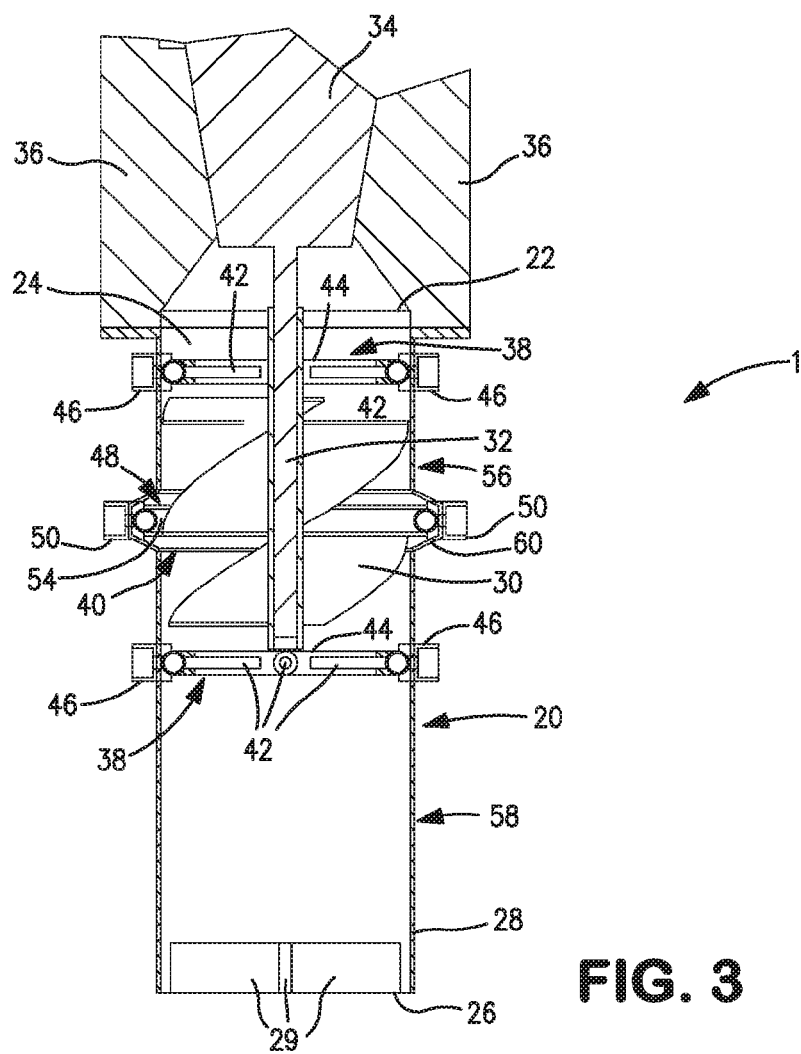
FIG. 3 is a fragmentary schematic, sectional view of the apparatus shown in FIG. 1.

With additional reference to FIG. 3, apparatus 1 is provided with a draft tube 20 that has an inlet opening 22 formed by an open end 24 of the draft tube 20. It is understood that inlet openings could also be situated at the sidewall of the draft tube with the corresponding end of the draft tube closed. A discharge opening 26 is located at the opposite end 28 thereof. A helical impeller 30 is located within the draft tube 20 that is driven by a shaft 32 attached to a motor 34. Motor 34 is connected to the draft tube 20 by means of blade-like elements 36. Motor 34 is also connected to the downwardly extending member 16 to thereby connect apparatus 1 to downwardly extending member 16. Motor 34 can be an electric motor of the type that is capable of functioning while submerged in the liquid. Gas driven motors are also possible. However, embodiments of the apparatus 1 are possible in which operations are conducted close to the surface of the liquid 2; and in such case, the motor 34 might not be of the type that is capable of submerged operations. Helical impeller 30 is preferably designed so that at each revolution, a volume of liquid is propelled through the draft tube 20 having a volume that approaches the volume of liquid proximate to, and situated below the helical impeller 30 in the draft tube. The design of the helical impeller is such that each rotation of the helical impeller. Additionally, there must be some clearance between the helical impeller 30 and the sidewall forming the draft tube 20. This clearance is designed to be at least less than or equal to 30% of the impeller diameter.

As can best be seen in FIG. 1, rotation of the helical impeller 30 creates a liquid flow by drawing the liquid 2 into the draft tube 20 from the inlet opening 22 as indicated by arrowheads "B". The liquid flow is then discharged from the discharge opening 26 as indicated by arrowhead "C". As shown in FIG. 3, preferably, a cruciform flow arrangement of guide vanes 29 can be provided at the outlet opening 26 as a flow straightener to promote flow in the direction of arrowhead "C" by helping to remove rotation within such flow as well as to impart further shear to the gas-liquid mixture.

Figure 4:
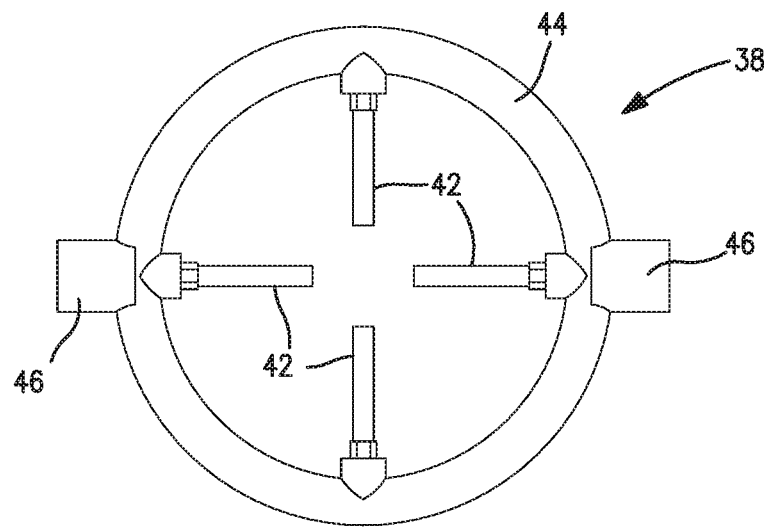
FIG. 4 is a top plan view of a gas injector in accordance with the present invention.

With continued reference to FIG. 3, situated within the draft tube 20 are three separate gas injectors that are designed to inject gas bubbles into the liquid flow passing through the draft tube 20. Two gas injectors 38 are situated above and below the impeller 30 and a gas injector 40 is located alongside the impeller 30. The gas injectors, inject gas bubbles into the flow within the draft tube 20. With reference to FIG. 4, each of the injectors 38 has a plurality of elongated spargers 42 located inside the draft tube 20 at radially spaced locations which can be at a 90 degree spacing. If a greater number of spargers 42 are provided, then the spacing would be less than 90 degrees. Each of the spargers 42 is formed by a metallic, sintered metal or a polymeric ultrafine bubble surface layer to form a plurality of injectors openings from which the gas bubbles are injected into the flow within the draft tube 20. As illustrated, spargers 42 are of cylindrical configuration and the gas bubbles will emanate principally from the curved side surfaces thereof. The spargers 42 are preferably connected to a ring-like manifold 44 that is also located within the draft tube 20. Opposed inlets 46 feed the ring-like manifold with the gas "A" and therefore, the spargers 42. It is to be noted that one of such inlets 46 could be employed. The opposed inlets 46 are connected to and penetrate the sidewall forming the draft tube 20.

Figure 5:
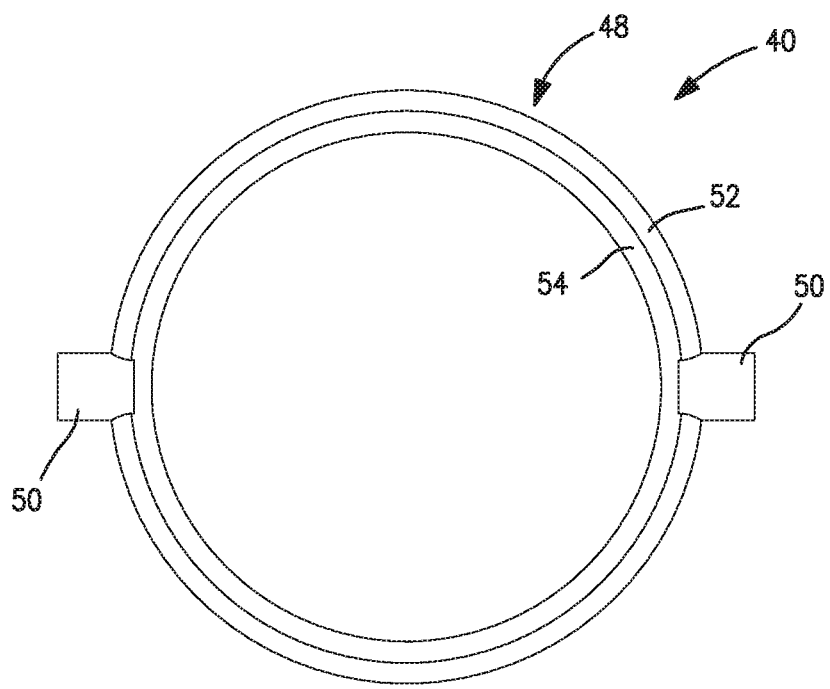
FIG. 5 is a top plan view of a gas injector in accordance with the present invention.

With reference to FIG. 5, gas injector 40 comprises a ring-like element 48 having at least one and as illustrated, preferably two opposed inlets 50 for the supply of the gas. Ring-like element 48 has an outer solid section 52 and an inner porous section 54 connected to the outer solid section 52. The inner porous section 54 is formed by a metallic, sintered metal or polymeric ultrafine bubble surface layer to provide the plurality of injector openings from which the gas bubbles emanate. In order to provide clearance with the helical impeller 30, draft tube 20 is split into two sections 56 and 58 that are connected by an outwardly-extending intermediate section 60 of annular configuration. Gas injector 40 is mounted within the outwardly-extending intermediate section 60. The two opposed inlets 50 penetrate such outwardly extending section 60. It is to be noted that it is possible to form the draft tube 20 in a single section with the inner surface of the gas injector 40 flush with the helical impeller 30.

With specific reference again to FIG. 1, opposed manifolds 61 and 62 are provided having feed conduits 64 and 66, respectively, that are in turn connected to opposed inlets 46 and 50 of the gas injectors 38. Manifold 61 is connected to manifold 62 by means of a connecting conduit 68 and manifold 62 is in turn connected to a supply pipe 70 through which the gas "A" is fed from a compressed gas source.

During operation of the apparatus 1, a recirculation loop is created for undissolved gas bubbles that are discharged from the discharge opening 26 and to the extent such gas bubbles remain undissolved that are recaptured within the liquid flow "B' being drawn into the inlet opening 22 of the draft tube 20. In such recirculation loop a portion of the gas bubbles dissolve in the liquid flow inside of the draft tube 20 and a remaining portion of the gas bubbles 72 are discharged from the discharge opening 26 and are carried into the liquid 2, within the liquid flow, where part of the remaining portion of the gas bubbles 72 dissolve in the liquid 2. A further part of the remaining portion of the gas bubbles 74 due to their buoyancy rises within the liquid 2 to be entrained into the liquid "B" drawn into the draft tube 20 through the inlet opening 22. In order to accomplish this, the gas bubbles that are injected must have at least a substantially uniform diameter of between 10.0 microns and 1.0 millimeters. A gas bubble diameter within this range serves two purposes. The small bubble size will of course enhance the surface area of the gas bubbles and therefore, a dissolution rate of the gas "A" within the liquid 2. Additionally, the buoyancy imparted to such gas bubbles, due to their size will result in at least a substantially low uniform terminal ascent velocity that can be controlled. This control of ascent velocity will allow a matching of such velocity with a superficial velocity of the liquid "B" being drawn into the inlet opening of the draft tube. The superficial velocity of the liquid "B" is controlled by the rotation speed of the impeller 30 that is imparted to the impeller 30 by the motor 34 and the shaft 32 thereof. This entrainment, depending upon the amount of gas injected, can act to substantially prevent escape of the gas from a surface of the liquid 2. Having said this, operations of the present invention are contemplated where there is some escape of the gas from the surface of the liquid 2. However, even in such operations, the small bubble size controlled to obtain a uniform, terminal ascent velocity less than the superficial velocity of the liquid "B" will nevertheless allow a substantial portion of the gas to be recaptured for recirculation back into the draft tube 20.

Figure 6:
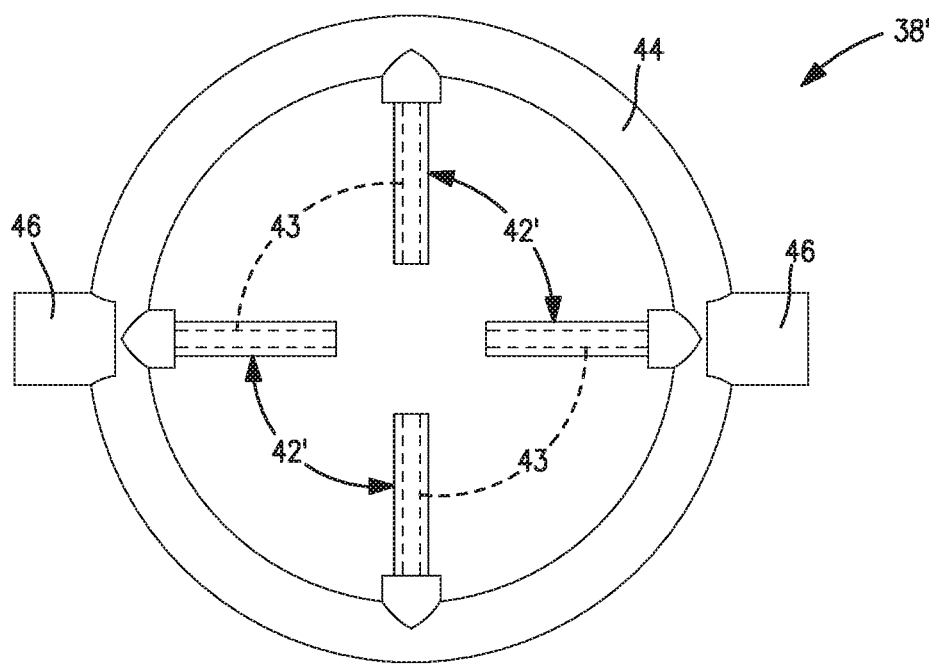
FIG. 6 is a top plan view of a gas injector in accordance with the present invention.

In order to obtain the bubble size of the injected gas bubbles, the spargers 42 of the gas injectors 38 and the inner surface 54 of the of gas injector 40 are provided with average pore sizes that are of the desired bubble size given that the injected gas bubbles cannot be smaller than the pores from which the gas is injected into the liquid 2. In case of metallic, sintered metal or a polymeric ultrafine bubble surface layer, the average pore size and therefore the bubble size can range between about 10 microns and about 500 microns. In this regard, in place of the spargers 42 of the gas injectors 38, as shown in FIG. 6, gas injectors 38' could be used having nozzles 42' in place of the spargers 42. Each nozzle 42' is of cylindrical configuration and is provided with an axial, cylindrical passage 43 terminating in an opening from which the gas bubbles enter the liquid. Such passage can range from 500 microns to 1 mm in diameter to form bubbles of between about 500 microns and about 1 mm. Other than nozzles 42', gas injector 38' would be identical to gas injector 38. As would be known to those skilled in the art, the pressure of gas "A" must be sufficient to overcome the pressure drop of the gas injector. This is less of a concern with gas injectors having nozzles. The gas flow to the gas injectors is important in that if the gas flow is too high, the bubbles will recombine and therefore, not be in the desired size range. Furthermore, there will invariably be a slight variance in the pore size of spargers using sintered metal or polymeric ultrafine bubble surface layers. Consequently, variations in bubble size of plus or minus ten percent, as discussed above, are acceptable in the practice of a method in accordance with the present invention. In case of spargers utilizing metallic, sintered metal or polymeric ultrafine bubble surface layers, the surface area of such material will have a direct influence on the amount of gas that can be dissolved in the liquid.

While three gas injectors, 38 and 40 are illustrated, it is possible to use only one of such gas injectors, gas injector 38 or gas injector 40 in a single location, for instance above or below the helical impeller 30. In case of gas injector 40, a single such injector could be situated alongside the helical impeller 30 as illustrated in the Figures. Additionally, a single gas injector 38' could be situated either above or below the helical impeller 30. Depending on application, the gas can be injected at either level. For example, in high viscosity systems it is beneficial to inject a process gas such as oxygen, above a high shear helical impeller using sintered metal sparger systems that allow fine bubbles to be contacted with the liquid in the high shear region proximate to and within the helical impeller region. Injecting the gases at the point of maximum shear allows for optimal gas-liquid contacting and dispersion of bubbles. It is to be noted that whether or not multiple gas injectors are used, it is to be noted that the flow of the gas will be less to an injector located above the helical impeller 30 given that as the flow of gas in such location increases, the gas will displace the liquid and the helical impeller will be less effective to motivate the liquid flow through the draft tube 20.

In more specific terms, the amount of gas "A" dissolved during the gas-liquid contacting process in the draft tube 20 is determined by several factors that include: (i) the length of the draft tube 20; (ii) the effective pressure in the draft tube 20; (iii) solubility of the gas under the temperature and pressure conditions in the draft tube 20; (iv) the shear and mixing conditions in the draft tube 20; (v) the size of the bubbles, which will determine the interfacial surface area available for gas-liquid contacting; (vi) the ratio of gas to liquid volumes; and (vii) the time available for gas-liquid contact in the draft tube 20. The quantity of un-dissolved gas bubbles 72 that are ejected at the discharge opening 26 of the draft tube 20 are therefore determined by the effectiveness of the mass transfer process in the draft tube 20 as outlined above.

The down-pumping action of the impeller 30 in the draft tube 20 sets up the recirculation loop, described above, with a maximum volumetric flow which is determined by the free, or sweep volume in the draft tube 20 and the rotational speed of the impeller 30. The range covered by the recirculation loop i.e., its horizontal reach will be a function of several variables which include: (i) liquid height over the inlet opening 22; (ii) intrinsic liquid suction draw that can be determined by multiplying the swept volume within the draft tube 20 or in other words, the volume of liquid evacuated from the draft tube by the helical impeller 30 during each rotation by the rotational speed of the helical impeller 30; and (iii) the clearance of the draft tube 20 from the bottom of the basin containing the liquid 2 which in the illustration is the basin bottom 4. This clearance can affect the presence or development of secondary mixing currents which can aid or impede the primary circulation flow. The horizontal range of the recirculation loop affects how much un-dissolved gases are recoverable. A wide horizontal range enables a larger quantity of un-dissolved gases to be captured.

The un-dissolved gas bubbles 74 are entrained in the high velocity jet "C" ejected at the discharge opening 26 of the draft tube 20. The bubbles will continue to be carried downwards in this jet as long as the viscous drag of the liquid exceeds the upward buoyancy force of the bubble. The liquid jet transfers momentum to proximate layers of the bulk liquid as it travels downwards. As shown by lines "D", the velocity of the jet "C" will decrease due to the viscous drag and hence, the jet of the liquid flow emanating from outlet opening 26 will tend to diverge as the velocity decreases. At a certain critical depth, the viscous and buoyancy forces balance out and the bubbles disengage. In general, the terminal ascent velocity of the gas bubbles 72 exceeds the bulk velocity of the entraining liquid jet at this point. Any un-dissolved gases captured in the liquid circulation loop will need to overcome the high velocity of the entrainment stream to break the liquid surface. For instance, assuming average bubble diameters of 1.0 mm, Stokes law dictates that a spherical gas bubble in water will have a terminal rise velocity of about 0.55 meters/second. In contrast, for the system specified in Table 1, the superficial liquid flow velocity of the liquid flow "B" being drawn into the inlet opening 22 of the draft tube is about 6.4 meters/second. In this regard, as used herein and in the claims, the term "superficial velocity" when used in connection with the liquid flow velocity of the liquid flow "B" means the flow rate through the draft tube 20 divided by the cross-sectional area thereof. The higher value of the superficial liquid velocity in the draft tube to the terminal rise velocity of the bubble ensures that undissolved gases are entrained in the liquid circulatory flow and do not break the surface. By ensuring that a higher relative value of superficial liquid velocity in the draft tube to the terminal bubble rise velocity is maintained, reliable capture and recovery of un-dissolved gases can be achieved without a collection hood or containment surface.

The following Table illustrates a calculated example of apparatus 1 functioning in a waste water environment in which the draft tube 20 is close to the surface of the liquid 2.

TABLE 1

| | |
|---|---|
| Impeller Diameter | 0.30 meters |
| Length of Draft Tube | 0.71 meters |
| Cross-sectional Area of Draft Tube | 0.0685 meters$^2$ |
| Volume of Draft Tube | 0.0487 meters$^3$ |
| Impeller Speed | 1800 RPM |
| Effective Liquid Flow | 26.2983 meters$^3$/minute |
| Superficial Liquid Velocity in draft tube | 6.40 meters/second |
| Effective Pressure in Draft Tube | 1.0 Atmosphere |
| Oxygen Solubility | 45.0 milligrams/liter |
| Saturation Oxygen Dissolution Potential in Draft Tube | 71.01 Kg/hour |
| Vg/Vl - at saturation | 0.0321 |
| Actual Oxygen Supply to Unit for >90% SOTE | 110.5 Kg/hour |
| Vg/Vl - at actual supply conditions (110.5 kg/hr) to achieve >90% SOTE | 0.05 |

For purposes of the Example, the helical impeller is designed such that during each revolution, the helical impeller propels a volume of liquid flow proportional to the volume within the draft tube that is situated proximate to and below the helical impeller. The effective pumping rate in the example is 26.3 m3/min, or 1578 m3/hr. Again, for this example, since the draft tube is close to the surface, the atmospheric pressure on the liquid being pumped by the draft tube is about 1.0 atmospheres; and at such pressure and assuming a temperature of about 20° C., the oxygen solubility is about 45.0 mgO$_2$/liter, or 0.045 kg O$_2$/m3. Given a pumping rate of 1578 m3/hr, the saturation dissolution limit for oxygen in the draft tube would amount to the oxygen solubility (0.045 kg O$_2$/m3) multiplied by the pumping rate (1578 m3/hr), i.e., 0.045 kg O$_2$/m3×1578 m3/hr which would be equal to 71.01 kg O$_2$/hr. In the example, the computed value of 71.01 kilograms per hour represents the maximum theoretical amount of oxygen that could be dissolved in the liquid flow if all of the injected oxygen were dissolved in the draft tube. This would correspond to a volume ratio of injected gas Vg and the volume of the effective liquid flow Vl equal to 0.0321. However, the apparatus 1 of the present invention is capable of dissolving more oxygen in the liquid flow that is discharged from the draft tube, in the ambient liquid surrounding the liquid flow and in recirculating at least a portion of the oxygen that remains undissolved back into the draft tube. As such a theoretical operation of the present invention is contemplated in which at a standard oxygen transfer efficiency ("SOTE") greater than 90 percent, 110.5 kg/hour of oxygen is injected. This would correspond to a Vg/Vl ratio of 0.05. Practically, at the lower limit, 11.05 kg/hour of oxygen would be lost at the surface of the liquid. However, 99.45 of the injected oxygen would not be lost and part of the excess above 71.01 kg/hour would be dissolved in the liquid and a further part thereof would be recirculated back to the draft tube given the small bubble size that is injected into the draft tube. The direct injection of small sized bubbles into the draft tube, allows the present invention to overcome the gas induction limits of the system, consequently, more gas is able to be injected into the liquid than in the prior art.

While the present invention has been described with reference to preferred embodiments, as will occur to those skilled in the art, numerous changes, additions and omissions can be made without departing from the spirit and scope of the invention as set forth in the appended claims.

We claim:

1. An apparatus for injecting a gas into a liquid comprising:
a draft tube adapted to be submerged in a liquid and having at least one inlet opening situated at one end of the draft tube and a discharge opening located at the other end thereof;
a helical impeller located within the draft tube;
a motor connected to the draft tube and a shaft projecting into the draft tube from the one end of the draft tube and connected to the helical impeller to rotate the helical impeller and thereby to create a liquid flow by drawing the liquid into the draft tube from the at least one inlet opening and discharging the liquid flow from a discharge opening;
means for injecting gas bubbles of the gas into the liquid flow, within the draft tube, in at least one location situated above or below or alongside the helical impeller such that a portion of the gas bubbles dissolve in the liquid flow inside of the draft tube and a remaining portion of the gas bubbles are discharged from the discharge opening and are carried into the liquid, within the liquid flow, where part of the remaining portion of the gas bubbles dissolve in the liquid and a further part of the remaining portion of the gas bubbles is entrained into the liquid drawn into the draft tube through the at least one inlet opening;
wherein the means for injecting gas bubbles has at least one injector opening and comprises an inner porous section of a sparger located within the draft tube and having a ring-like configuration, and means for supplying the gas to the means for injecting gas bubbles at a predetermined flow rate, the at least one injector opening sized to produce the gas bubbles within the liquid with the uniform diameter at the predetermined flow rate; and
the means for injecting gas bubbles configured to inject the gas bubbles with at least a substantially uniform diameter of between about 10.0 microns and about 1.0 millimeter to enhance the surface area of the gas bubbles and therefore, a dissolution rate of the gas within the liquid and to impart a buoyancy to the further part of the remaining portion of the gas bubbles that will result in at least a substantially uniform terminal ascent velocity thereof; and the impeller configured and the motor able to rotate the impeller at a sufficient speed such that the liquid drawn into the draft tube has a minimum superficial velocity greater than the substantially uniform terminal ascent velocity of the gas bubbles to enable the entrainment of the further part of the remaining portion of the gas bubbles into the liquid drawn into the draft tube.

2. The apparatus of claim 1, wherein:

the sparger having an inlet for the gas penetrating a sidewall of the draft tube;

the ring-like element having an outer solid section and the inner porous section connected to the outer solid section and formed by a metallic, sintered metal or polymeric ultrafine bubble surface layer to provide the plurality of injector openings; and the plurality of injector openings are sized to produce the gas bubbles within the liquid, at the predetermined flow rate, with the uniform diameter within a range of between about 10 microns and about 500 microns.

* * * * *